US009344332B2

(12) United States Patent
Heintz et al.

(10) Patent No.: US 9,344,332 B2
(45) Date of Patent: May 17, 2016

(54) METHOD FOR ASSISTING IN THE INSTALLATION OF A HOME AUTOMATION SYSTEM AND RELATED INSTALLATION DRIVER PACKAGE

(75) Inventors: Bruno Heintz, Paris (FR); Jean-Marc Oury, Paris (FR); Hugues Lefebvre De Saint Germain, Sainte-Foy-les-Lyon (FR); Pierre Bivas, Le Vesinet (FR); Mathieu Bineau, Versailles (FR)

(73) Assignee: VOLTALIS, Paris (FR)

( * ) Notice: Subject to any disclaimer, the term of this patent is extended or adjusted under 35 U.S.C. 154(b) by 16 days.

(21) Appl. No.: 14/123,236

(22) PCT Filed: Jun. 11, 2012

(86) PCT No.: PCT/FR2012/051298
§ 371 (c)(1),
(2), (4) Date: Mar. 4, 2014

(87) PCT Pub. No.: WO2012/172242
PCT Pub. Date: Dec. 20, 2012

(65) Prior Publication Data
US 2014/0169218 A1    Jun. 19, 2014

(30) Foreign Application Priority Data
Jun. 16, 2011 (FR) .................................... 11 55284

(51) Int. Cl.
*H04L 12/24* (2006.01)
*H04L 12/28* (2006.01)

(52) U.S. Cl.
CPC ........ *H04L 41/0806* (2013.01); *H04L 12/2834* (2013.01); *H04L 2012/2841* (2013.01)

(58) Field of Classification Search
CPC ............ H04L 41/0806; H04L 12/2834; H04L 12/2803; H04L 12/2814; H04L 12/2816; H04L 2012/2841
See application file for complete search history.

(56) References Cited

U.S. PATENT DOCUMENTS 8,612,056 B2 * 12/2013 Klasson et al. ............... 700/279
2006/0038672 A1 * 2/2006 Schoettle ....................... 340/522

FOREIGN PATENT DOCUMENTS

WO    2009040761    4/2009
WO    2010017588    2/2010

OTHER PUBLICATIONS

Search Report dated 2012.

* cited by examiner

*Primary Examiner* — Curtis A Alia
(74) *Attorney, Agent, or Firm* — Sofer & Haroun, LLP

(57) ABSTRACT

A method is provided for assisting in the installation of a home automation system, including a plurality of communicating packages suitable for exchanging information with one another via a local home automation network, at least one of the communicating packages being a driver package suitable for exchanging information with a central platform of the Internet network via a wireless packet-telephony connection. The method includes a step of connection (120) of a portable installation driver package and automatic searching (130) in situ for the best mobile operator to set up the wireless connection from the installation driver package from a predefined list of possible mobile operators The method includes automatic pairing (160) of each communicating package with a driver package and different steps (142-145, 150, 171, 172) for testing the operation of each communicating package.

13 Claims, 4 Drawing Sheets

METHOD FOR ASSISTING IN THE INSTALLATION OF A HOME AUTOMATION SYSTEM AND RELATED INSTALLATION DRIVER PACKAGE

RELATED APPLICATIONS

This application is a National Phase Application of PCT/FR2012/051298, filed on Jun. 11, 2012, which in turn claims the benefit of priority from French Patent Application No. 11 55284 filed on Jun. 16, 2011, the entirety of which are incorporated herein by reference.

BACKGROUND

1. Field of the Invention

The present invention relates to the large-scale installation of home automation packages, communicating not only with one another in an internal network, but also with a central platform hosted by an Internet server.

The present invention applies notably, although not exclusively, to the deployment of a system for the real-time measurement and modulation of the power consumption of a plurality of electrical devices.

2. Description of Related Art

The Applicant has developed a measurement and modulation system of this type, the principle of which is described notably in the document WO2008/017754, and the main elements of which are shown schematically in FIG. 1. This measurement system comprises at least one modulator package 1 to which a plurality of electrical devices 2 (such as water heaters, electric radiators, air conditioning units, etc.) can be connected individually or in series on current loops. The modulator package 1 is suitable for measuring in real time the voltages and currents consumed by these electrical devices 2, and for sending the measurements periodically, for example every ten minutes, to an external platform 3 hosted by an Internet server. This periodic sending of the measurements is carried out via a wireless communication modem 4 integrated into a driver package 5 of the system, the wireless communication modem 4 enabling a packet-telephony connection 6, such as GPRS, 3G or 4G, to be set up to the Internet platform 3. Alternatively, the connection so the Internet network can be set up via an Ethernet link. The driver package 5 is preferably separate from the modulator package 1 and connected to the latter via a wired link 7, preferably via power line communication or PLC. To do this, each of the modulator packages 1 and driver packages 5 is equipped with a PLC modem (not shown). The driver package 5 can thus be connected to a plurality of modulator packages 1 of which it collects the measurements to send them to the external platform 3. The driver package 5 advantageously comprises a USB port (not shown), which allows the connection of additional modules such as short-range radio modems or temperature sensors. Thus, it can also be provided that the transmission of the measurements from the modulator packages 1 is carried out via this radio frequency channel. The measurements received by the external platform 3 are stored and can be visualized at any time and from any location by the user, who can connect to his user space on the Internet by any known means. The platform 3 is furthermore capable of sending commands to the driver package 5 via the wireless packet-telephony connection 6 to control the interruption of the power supply of all or some of the electrical devices 2 connected to the different modulator packages 1 during a predetermined period. The periods of interruption are generally less than half an hour, so that the users affected by the disconnections of all or some of their electrical devices, such as heaters or air conditioning units, do not suffer any inconvenience. The power supply is controlled via the modulator packages 1. By means of this system, and apart from the possibility of monitoring the consumption by each user, a large quantity of modulator packages 1 and driver packages 5 can be managed simultaneously in the centralized platform 3, and the electric power consumed by a set of users can easily be modulated, on a municipal, departmental, regional or national scale, in particular during consumption peaks, without the need for the electric power suppliers to produce more electricity.

The installation of a home automation network, such as the modulator and driver packages previously described, in the home of a user, comprises a plurality of phases which are highly dependent on the installation environment:

It is first of all necessary to know some information specific to the user, such as his installation type (number of installed modulator packages and driver packages, pairing of the different packages and electrical equipment, Internet connection type, etc.), his contact details, his electricity tariff, or the type of dwelling. These data are traditionally collected by an engineer in situ during the installation, on paper or tablet computer, so that they can then be entered manually by an operator into the system database. This results in delays, often of several days, in the input of the data into the database, as well as high risks of entering incomplete or incorrect data, the risks being increased due to the double entry of the information.

Furthermore, since the connection of the driver packages to the external Internet network can be set up via ADSL, or preferably via a mobile link (GPRS/3G), it is necessary, in this latter case, to test the connections offered by all existing mobile operators in order to choose the connection that provides the best conditions in terms of reception, speed, and possibly costs. Only when the mobile operator has been chosen can the driver packages be equipped with the SIM card corresponding to this mobile operator. Today, this test is laborious to carry out since the driver packages can only be equipped with a single SIM card for reasons of size and cost.

Furthermore, it is necessary to define very precisely the type and characteristics of the electrical devices connected to each channel of the modulator package(s), no connect, if necessary, the modulator packages to the best driver package when it is intended to install a plurality of them, to test the complete installation, and also each device that makes up the system, and to manage the faults of some devices (above all the relay devices), or the impact of the de-installation of these devices. None of the preceding tests carried out today in an automatic manner, and the correct performance of the different tests by the installing engineer is not guaranteed. A complete and reliable installation procedure may also take several days, and may require several site visits by the installing engineer.

The result of this is a procedure which may prove costly in most cases.

OBJECTS AND SUMMARY

The object of the present invention is to simplify, optimize and automate the large-scale installation of communicating packages and home automation elements in variable environments. The invention applies to any system in which one or more communicating packages are capable of exchanging information, on the one hand with an Internet network via a wireless packet-telephony communication, and, on the other hand, with a plurality of home automation elements via a power line or wireless local communication.

More precisely, the subject matter of the present invention is a method for assisting in the installation of a home automation system including a plurality of communicating packages suitable for exchanging information with one another via a local home automation network, at least one of the communicating packages being a driver package suitable for exchanging information with a central platform of the Internet network via a wireless packet-telephony connection, characterized in that it comprises the following steps:

- connection of a portable installation driver package in said local home automation network;
- automatic search in situ for the best mobile operator to set up said wireless connection from the installation driver package from a predefined list of possible mobile operators;
- automatic pairing, from said installation driver package, of each communicating package with a driver package of said local home automation network;
- functional tests of each communicating package of the system and of the complete system from said installation driver package.

The invention thus optimizes the installation phases of the home automation system. According to other preferred characteristics of the invention:

- the method may furthermore comprise the steps of local input, from said installation driver package, of information specific to the installation and automatic transmission of said specific information from the installation driver package to the central platform via said wireless connection or via an Ethernet connection. The errors and loss of time due to double entry are thus avoided.
- the search step may comprise the sub-steps of successive connections by said installation driver package to said central platform via each possible mobile operator and transfer of a short file, for measurement and storage of the technical parameters of each connection from the transferred short file, and calculation of a weighted sum of said technical parameters for each connection and selection of the mobile operator to which the greatest weighted sum corresponds.
- the technical parameters include the quality of the signal corresponding to the transferred file and the speed of the connection.
- the method may furthermore comprise a sub-step of automatic retrieval of additional parameters relating to the pricing of each mobile operator; in this case, the weighted sum also depends on these additional parameters.
- the aforementioned pairing step may comprise the sub-steps of scanning by the installation driver package of the local home automation network and creation of a list of the communicating packages and driver packages present on the local home automation network, searching for an available driver package and pairing with said available driver package, and transmission by the installation driver package of the information linked to each pairing to the central platform via the wireless connection.
- the communicating packages include, for example, at least one modulator package suitable for measuring in real time the voltages and currents consumed by at least one electrical device connected to it, and for transmitting the measurements to the central platform via the driver package. The driver package and the modulator package may be integrated into the same package.
- the modulator package may also receive modulation or programming commands, or software updates, from the central platform via the driver package.
- for this particular application, the test steps comprise notably the measurement, under the control of the installation driver package, of the voltage and current of said electrical device by the modulator package and the transmission of this measurement to the installation driver package; the checking of the success of a modulation command. then of an end-of-modulation command between said driver package and said modulator package.
- the local home automation network may also be a power line communication network or a radiofrequency network.

The subject matter of the present invention is also a portable installation driver package for carrying out the method, characterized in that it comprises:

- first means suitable for enabling the installation driver package to exchange data locally with the communicating packages and driver packages of the local home automation network;
- second means suitable for enabling the installation driver package to access the Internet network to exchange data with the central platform via wireless connections for all the mobile operators on the predefined list;
- software routines stored in a read-only memory, suitable for carrying out said search, pairing and test steps.

BRIEF DESCRIPTION OF THE DRAWINGS

Different aspects of the invention will become evident from the following description, given with reference to the attached figures, in which.

DETAILED DESCRIPTION

In the description below, the elements common to the different figures bear the same references. The invention will be described in the non-limiting context of the installation of the driver packages and modulator packages forming part of a system for the real-time measurement and modulation of the power consumption of a plurality of electrical devices.

Figure 1:
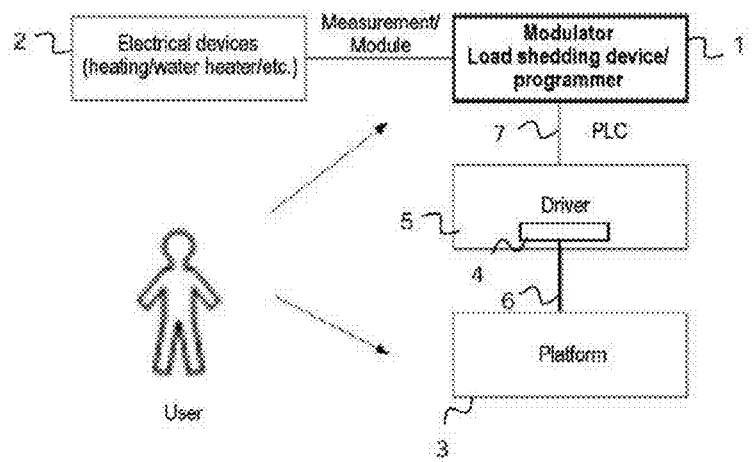
FIG. 1, described above, shows schematically a known system for the real-time measurement and modulation of the power consumption of a plurality of electrical devices.
Figure 2:
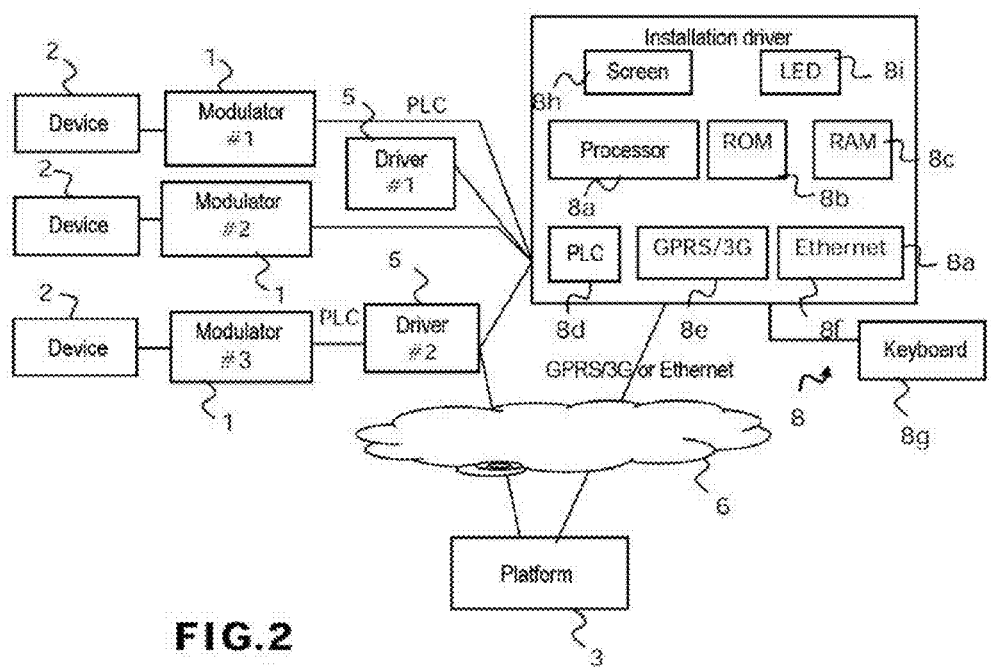
FIG. 2 shows schematically an intermediate stage of the installation of a home automation system according to the invention, such as a system. for the real-time measurement and modulation of the power consumption of a plurality of electrical devices.
Figure 3:
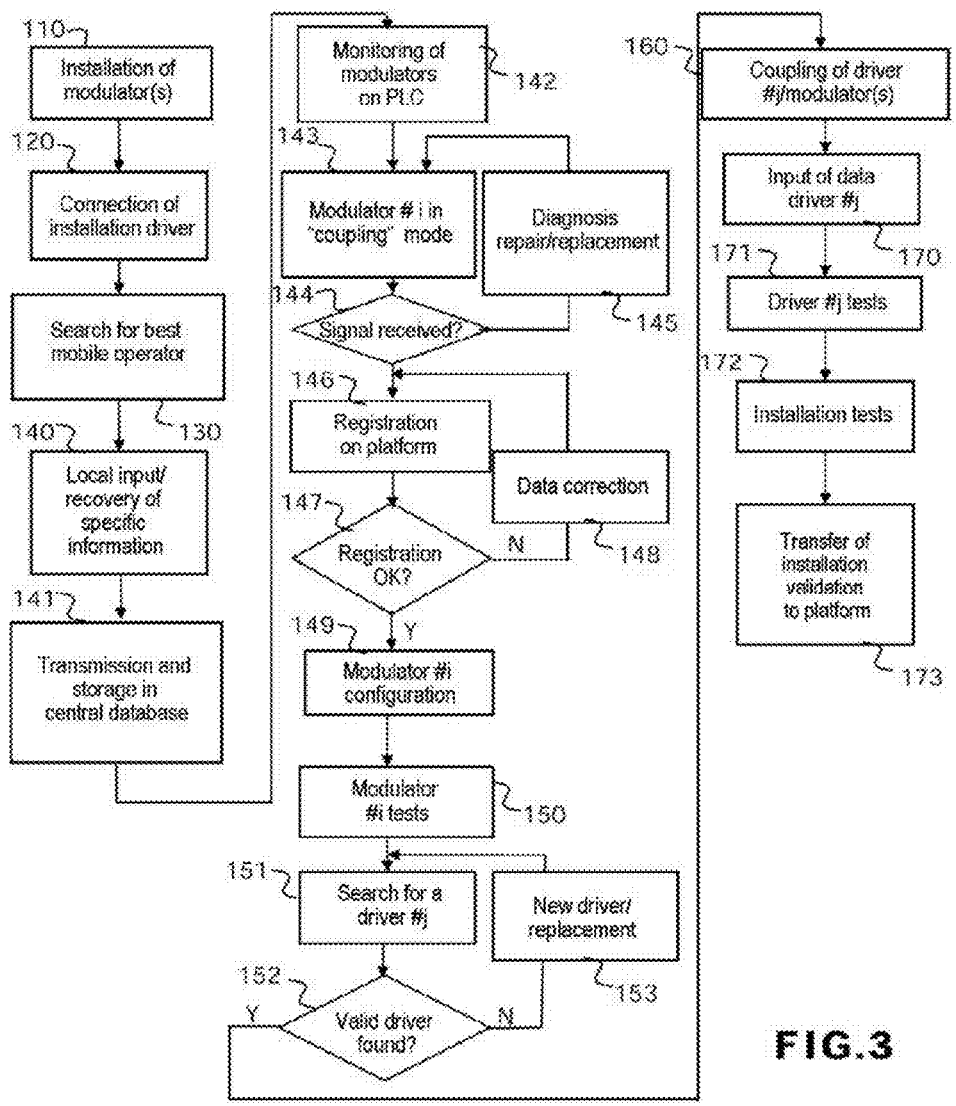
FIG. 3 provides a synopsis of the different possible steps during the installation of the home automation system shown in FIG. 2.

It is proposed to explain an installation procedure according to the present invention in the context of the system shown schematically in FIG. 2, at an intermediate stage or the installation procedure. Furthermore, reference will then be made to FIG. 3 to follow the steps of the installation procedure according to the invention.

In this example, it is provided to install three modulator packages 1 in the home of a user, each package intended to be connected to an electrical device 2, and two driver packages 5 with which. the modulator packages 1 will be able to exchange data, preferably via power line communication. This installation will be optimized according to the invention by using a portable installation driver package 8.

This package 8 essentially includes an electronic card equipped with a processor 8$a$, a read-only memory 8$b$ and a random access memory 8$c$, first means enabling it to exchange data locally with the modulator packages 1 and the driver packages 5 via a home automation connection (here a PLC modem 8$d$), and second means enabling it to access the Internet network 6 to exchange data with the central platform 6, in particular a GPRS/3G modem 8$e$, and an Ethernet modem 8$f$. The different modems may be integrated into the package 8, or may be in the form of external USE modules, to be connected to a USE port (not shown) of the package 8. The installation driver package 3 is configured to enable a connection for each of the national mobile operators. It typically integrates the different SIM cards dedicated to the different operators. The package 8 furthermore includes different man-machine interface modules, such as a keyboard 8$g$, a screen 8$h$ and indicator means, typically LEDs 8$i$. The screen 8$h$ may be small enough to be integrated into the package. The keyboard 8$g$ is preferably a peripheral device which can be connected no the package 8 via a USE connection. The screen 8$h$ may also be a touchscreen, in which case no keyboard is required. Different software routines intended to be executed by the microprocessor to assist with the installation are then stored in the read-only memory 8$b$.

The software of the package 8 may furthermore be updated automatically from the central platform 3 after an Internet connection has been set up, by means of either the wireless link he or the Ethernet link 8$h$.

In FIG. 2, the three modulator packages 1 have already been positioned and connected no their respective electrical device 2. Furthermore, the two driver packages 5 have also been positioned and the modulator package #3 has already been paired with the driver package #2. It must be remembered that each modulator package 1 can control a plurality of electrical devices in an independent manner. Similarly, the same driver package 5 can be connected to a plurality of modulator packages 1. In the network structure given as an example in FIG. 2, the pairing of the modulator package #1 and the modulator package #2 with one of the installed driver packages is still to be carried out. It will be possible no carry out this pairing via the installation driver package 8 as will now be described in the following explanation of the complete installation procedure, given with reference to FIGS. 3 to 5:

At the end of a first step 110, the different modulator packages 1 are already positioned and capable of communicating on the local home automation network, here the PLC network. The installing engineer proceeds with the connection of the package 8 (step 120), and notably its connection to the PLC network. It must be noted that steps 110 and 120 could be carried out in reverse order. The installation driver package 8 will then be able to carry out (step 130) a search for the mobile operator offering the best GPRS/3G connection (or any other cellular connection) to the Internet network. This search may be started automatically by the processor 8$a$, once the package 8 has been connected, or under the manual control of the engineer, via, for example, the keyboard 8$g$.

Figure 4:
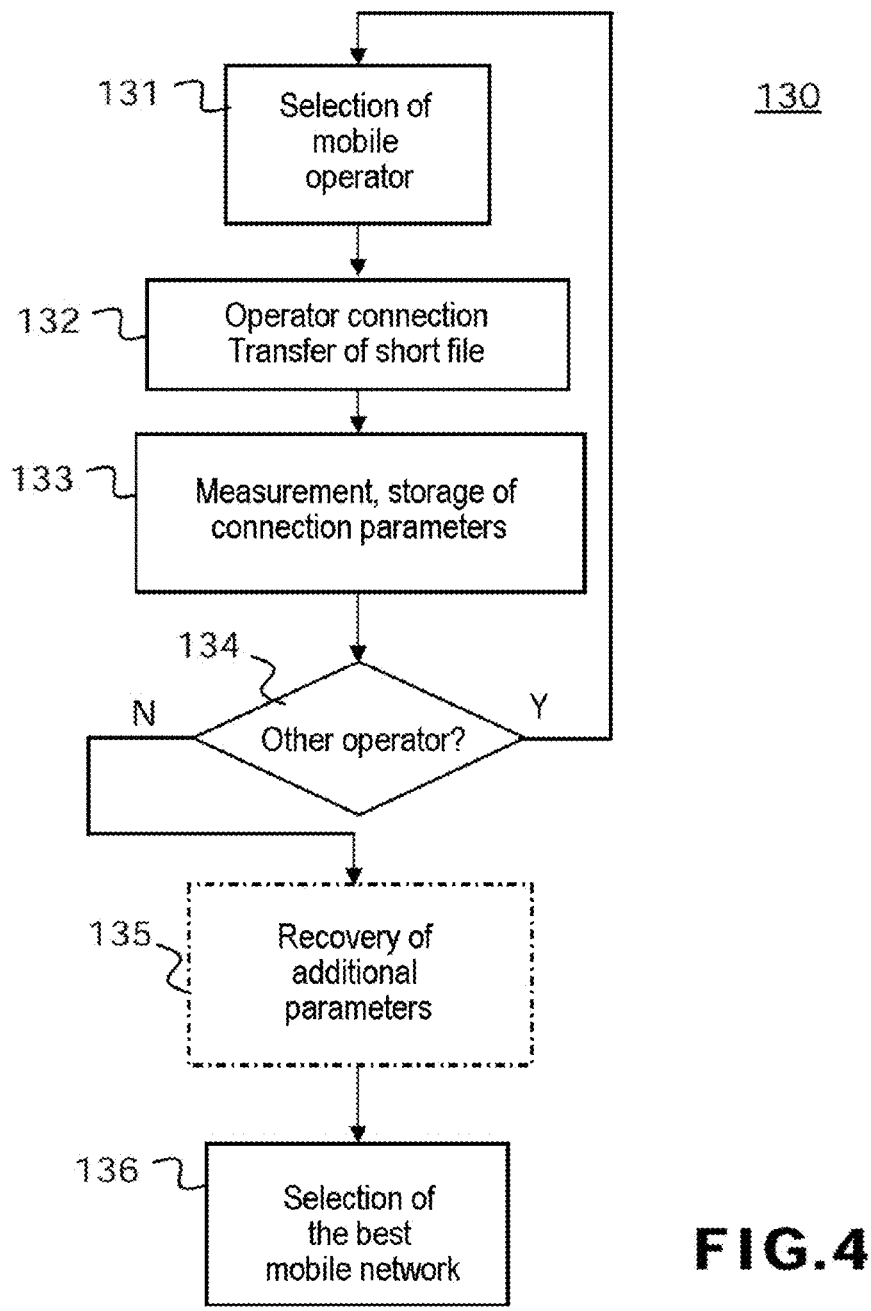
FIG. 4 shows the steps carried out according to the invention to search for a mobile operator.
Figure 5:
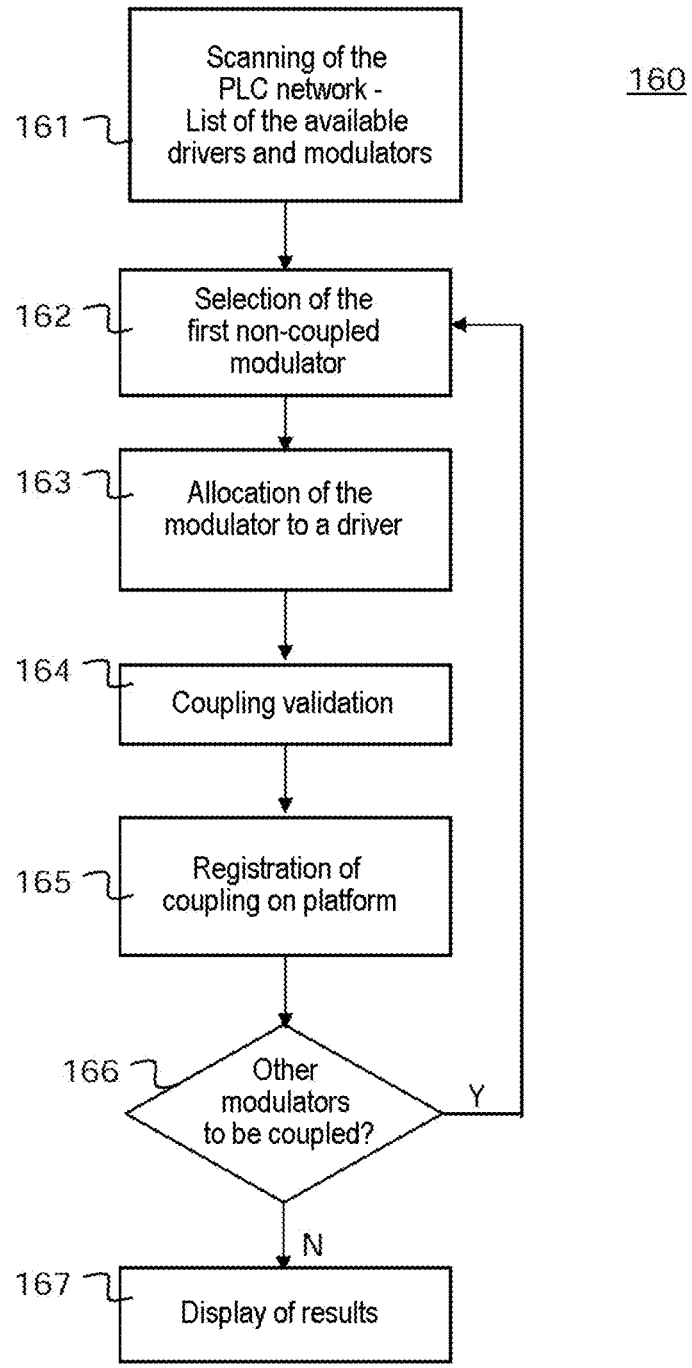
FIG. 5 shows the steps corresponding to the pairing of the communicating packages.

The details of the search procedure, implemented by a software module stored in the ROM 8$h$, are explained in FIG. 4:

The installation driver package 8 begins by selecting an operator from the mobile operators available in its configuration (sub-step 131), then proceeds with an attempt to connect to the central platform 3 via the selected operator and to transfer a short file (sub-step 132). If the connection fails, the search procedure is restarted for a different operator. if not, the connection parameters, in particular the quality of the signal corresponding to the transferred file and the speed of the connection, are measured from the transferred short file and are stored, preferably in the package 8 (sub-step 133). A sub-step 134 indicates whether all of the possible mobile operators have been tested, sub-steps 131 to 133 being reiterated. for all of the possible mobile operators. At the end of the preceding sub-steps, the installation driver pilot 8 therefore has the technical parameters linked to each connection. It may, optionally, also take account of other parameters such as the pricing of each operator, or specific cost agreements between. the mobile operator and the operator of the platform 3. These additional parameters may either be stored in the installation driver or retrieved by a connection of the installation driver to the central platform 3 (sub-step 135). The package 8 may then select (sub-step 136) the operator offering the best connection. To do this, a rating is allocated to each connection by calculating a weighted sum of each parameter, and the mobile operator for which the offered connection corresponds to the highest rating is selected. The installing engineer can advantageously follow all or part of the search step on the screen 8$h$.

At the end of the search procedure 130, he thus knows the finally selected mobile operator, and will be able to equip each of the driver packages 5 provided in the installation (packages #1 and #2 in FIG. 2) with the SIM card corresponding to this mobile operator.

At this stage of the installation, the installing engineer can advantageously make use of the existing Internet connection between the installation driver package and the central platform 3 to collect all the specific information linked to the installation. He can thus enter a certain number of data locally via the keyboard 8$g$, such as an identifier of the installation site, an identifier relating to the installing engineer, the topology of the network to be installed, the names and contact details of the user, the power contracted with his power supplier, the type of dwelling, the surface area of the dwelling, etc. (step 140 in FIG. 3). He may, optionally, also recover certain information communicated by the central platform 3. All the specific information is then automatically transmitted to the central platform 3 by the installation driver package 8 for storage in the centralized database (step 141). The end of step 141 corresponds to a validation of the Internet connection and the input of the specific data. The installing engineer can be alerted to the end of this step 141, for example through illumination of one of the LEDs 8$i$ present on the installation driver package 8 and/or through display on the screen 8$h$.

The installation procedure continues with the search for, configuration and testing of all the modulator packages 1 installed in step 110. The installation driver package 8 is first set to a listen mode to monitor the local home automation network (here the PLC network), suitable for receiving all the signals transmitted by the modulator packages (step 142). This may be triggered automatically, at the end of step 141, or preferably on input, of a command by the installing engineer via the keyboard 8$g$. The latter then sets one of the modulator packages to a so-called "coupling" mode, for example by pressing a dedicated button present on this package (step 143), a mode during which the modulator package concerned will transmit a PLC signal. The installation driver package 8 then tests whether the PLC signal has been correctly received (step 144). If the signal is not received during a certain period, the installing engineer will have to recheck the installation of the modulator package concerned. In the event of failure following the check, the installing engineer is informed on the screen 8*h* of the need to replace the modulator package 1 with another (step 145). Steps 143, 144, and possibly 145 are then reiterated for this replacement package. As soon as a PLC signal (transmitted either by the initially installed modulator package or by the replacement package) is received by the installation driver 8, the latter extracts the identifier corresponding to the modulator package from the received PLC signal and transmits it automatically to the central platform 3, via the GPRS/3G connection, for the purpose of its registration (step 146). The central platform 3 then checks whether the received identifier is consistent with the previously stored. data (step 147). If the registration cannot be carried out, the central platform 3 asks the installation driver to correct the data (step 148). If, on the other hand, the registration is validated, the installing engineer is informed of this immediately via a suitable message displayed on the screen 8*h* and/or the illumination of one of the LEDs 8*i*. The installing engineer can then proceed with the configuration of the modulator package 1 concerned (step 149), and notably with its connection to the different electrical devices which it must control and to the digital output of the electricity meter installed in the dwelling of the user when said output exists.

At the end of step 149, the installing engineer then controls the installation driver 8 so that the latter starts a series of tests intended to check the correct operation of the modulator package #i concerned (step 150). The tests carried out are notably as follows:

Measurement/Modulation of Each Channel of the Modulator Package #i:

In response to a command given by the installation driver package 8 to the modulator package #i via a PLC control signal, the modulator package #i carries out the measurements of she voltages and currents of the electrical devices connected to it and communicates these measurements via the power line communication to the installation driver package 8 for validation of the test.

Connection to the Digital Output of the Electricity Meter (If Present):

In response to a command given by the installation driver package 8 to the modulator package #i via a PLC control signal, the modulator package #i communicates the data which it receives from the digital output of the meter to the installation driver package via the power line communication. The installation driver package 8 validates or otherwise the test by checking that the data are non-zero and consistent.

Connection of the Measuring Devices (Radio Link or PLC)

Measuring devices, for example temperature sensors, can be connected to the modulator package #i. In this case, it is appropriate to test the modulator package in relation to this connection. in response to a command given by the installation driver package 8 to the modulator package #i via a PLC control signal, the modulator package #i asks the measuring device to transmit a measurement to it, and communicates the measurement via the power line communication to the installation driver package. The installation driver package 8 validates or otherwise the test by checking that the received measurement is consistent with the measurement obtained from a similar measuring device and calibrated on the installation driver.

Steps 143 to 150 described above are reproduced for each modulator package 1 present in the installation. It should be noted that step 150 can be started. either immediately on the modulator package 4*i* involved in the registration (step 147), or once all, the modulator packages have been configured (step 149).

The installation procedure continues with the search by the installation driver package 8 for a valid driver package 5 (step 151). "Valid" is understood to mean a driver package 5 present on the existing local PLC home automation network, suitable for exchanging PLC signals with an adequate quality, and having at least one input/output not yet paired with a modulator package. In the example shown in FIG. 2, the driver package #1 will be able to be considered. as valid in the sense that it has not yet been paired with a modulator package. If no valid driver package 1 has been detected (step 152), the installing engineer may decide to replace an existing driver package or install an additional driver package (step 153). During this step, it is possible that a driver package previously installed, for example in a neighboring apartment, is recognized as valid, in which case it will not be necessary to install a new driver package.

When a valid driver package 1 has been found, the installation procedure continues with the coupling (or pairing) of this driver package 1 with the nearest modulator package (s). This step 160 is shown in detail in FIG. 5 and is described below:

The installation driver package 8 begins by performing a scan of the local home automation network, here the PLC network, in order to create the list of all available driver packages and modulators (step 161), and also their characteristics (connection, mobile operator linked to a driver package, number of modulator packages already coupled to the driver package, etc.). The procedure continues with the search for the first non-coupled modulator package (step 162). It is then decided to allocate this first selected modulator package to a driver package having available space, this decision being able to be taken either by the central platform 3 or by the installation driver package 8 (step 163). In this latter case, the allocation process is faster, but less flexible. The algorithm defining the be driver can be varied according to requirements and the parameters to be optimized (cost, technical performance). The pairing is then validated by the driver package 5 and the modulator package 1 concerned, and is updated. in the installation driver package (step 164). All the information linked to the pairing is then transmitted to the central platform 3 via the GPRS or 3G connection for storage in the database (step 165). Steps 162 to 165 are reiterated for as long as a modulator package to be coupled still exists in the list (test carried out in step 166). The pairing process advantageously ends with a display of the final results on the screen 8*h*, allowing the installing engineer to check whether any orphan modulators and/or drivers exist and, if necessary, take any appropriate action (step 167). Here also, one of the LEDs 8*i* and/or the screen 8*h* can serve to validate or otherwise the end of the pairing process.

At the end of the pairing process, all the data relating to each driver package 1, notably its location, its different couplings, the associated mobile operator for the GPRS or 3G connection (step 170 in FIG. 3) can be sent automatically to the platform, with or without a manual check.

The installing engineer then controls the installation driver 8 so that the latter starts a series of tests intended to check the correct operation of the different driver packages 5 (step 171). The tests carried out for each driver #j are notably as follows:

PLC Connection:

The installation driver package 8 checks that it can communicate via PLC (or according to the link protocol adopted for the local home automation network) with the driver package #j.

Cellular Connection:

In response to a request from the installation driver package 8, the driver package #j tests a GPRS or 3G connection to the central platform 3 by passing through the mobile operator allocated to it.

Connection of the Measuring Devices (Radio Link or PLC):

As in the case of the modulator packages, measuring devices, for example temperature sensors, can be connected to the driver package #j, for example via a USA connection or radio link. In this case, it is appropriate to test the modulator package in relation to this connection. In response to a command given by the installation driver package 8 to the driver package #j via a PLC control signal, the driver package #j asks the measuring device to transmit a measurement to it, and communicates the measurement via the power line communication to the installation driver package. The installation driver package 8 validates or otherwise the test by checking that the received measurement is consistent with the measurement obtained from a similar measuring device and calibrated on the installation driver.

The installing engineer then controls the installation driver 8 so that the latter starts a series of tests intended to check the correct operation of the entire installation (step 172). During these tests, notably the success of a modulation command and then of an end-of-modulation command are checked for each of the driver/modulator pairs.

A successful installation may advantageously result in the automatic transmission to the central platform 3 of an end-of-installation number allocated by the installation driver 8 (step 173).

In a general manner, the validity of the installation can be checked by the central platform 3, whereby the results of each of the steps 110 to 167 detailed above can be transmitted in real time by the installation driver package 8 to the central platform 3.

At any time during the installation, the installing engineer can furthermore take photographs or films of the installation and load these photographs or films via the USB port of the installation driver package 8 in such a way as to transmit them to the central platform 3 using the GPRS connection. This allows the after-sales service to be optimized.

By means of the installation driver package and the installation procedure according to the invention, the following installation phases of the home automation network have been optimized:

Selection of the best Internet connection (ADSL or choice of the best mobile operator);

Registration with the central server of the system. This phase enables the validation of the Internet connection, and also the checking or registration of user data (name, address, but also installation type, parameterization, etc.);

optimization of the number of driver packages to be installed;

immediate validation of the correct operation of each device of the home automation installation, by means of test programs installed in the memory 8, hardware replacement or de-installation if required.

This results in a significant reduction in working time, and therefore in the cost incurred in the installation

The invention claimed is:

1. A method for assisting in the installation of a home automation system, including a plurality of communicating packages suitable for exchanging information with one another via a local home automation network, at least one of the communicating packages being a driver package suitable for exchanging information with a central platform of the Internet network via a wireless packet-telephony connection, said method comprising the steps of:

connection of a portable installation driver package in said local home automation network;

automatic search in situ, from the installation driver package, for the best mobile operator to set up said wireless packet telephony connection from a predefined list of possible mobile operators and selection of said best mobile operator;

automatic pairing, from said installation driver package, of each communicating package with a driver package of said local home automation network; and functional tests of each communicating package of the system and of the complete system from said installation driver package, wherein the automatic search and selection of said best mobile operator is performed once during the installation process and said method further comprises equipping said driver package with said wireless packet telephony connection using the selected best mobile operator.

2. The method as claimed in claim 1, wherein said method furthermore comprises the following steps:

local input, from said installation driver package, of information specific to the installation: and automatic transmission of said specific information from the installation driver package to the central platform via said wireless connection or via an Ethernet connection.

3. The method as claimed in claim 1, wherein the search step comprises the following sub-steps:

successive connections by said installation driver package to said central platform via each possible mobile operator and transfer of a short file;

measurement and storage of the technical parameters of each connection from the transferred short file; and calculation of a weighted sum of said technical parameters for each connection and selection of the mobile operator to which the greatest weighted sum corresponds.

4. The method as claimed in claim 3, wherein said technical parameters include the quality of the signal corresponding to the transferred file and the speed of the connection.

5. The method as claimed in claim 3, wherein said method furthermore comprises a sub-step of automatic retrieval of additional parameters relating to the pricing of each mobile operator, and in that said weighted sum also depends on said additional parameters.

6. The method as claimed in claim 1, wherein the pairing step comprises the following sub-steps:

scanning by the installation driver package of the local home autot ation network and creation of a list of the communicating packages and driver packages present on the local home automation network;

for each unpaired communicating package, searching for an available driver package and pairing with said available driver package; and transmission by the installation driver package of the information linked to each pairing to the central platform via the wireless connection.

7. The method as claimed in claim 1, wherein said communicating packages include at least one modulator package suitable for measuring real time the voltages and currents consumed by at least one electrical device connected to it, and for transmitting the measurements to said central platform via said driver package.

8. The method as claimed in claim 7 wherein the driver package (5) and the modulator package (1) are integrated no the same package.

9. (previous)y presented) The method as claimed in claim 7, wherein the test steps comprise:
   the measurement, under the control of the installation driver package, of the voltage and current of said electrical device by the modulator package and the transmission of this measurement to the installation driver package; and
   the checking of the success of a modulation command then of an end-of-modulation command between said driver package and said modulator package.

10. The method as claimed in claim 1, wherein the local home automation network is a power line communication network.

11. The method as claimed in claim 1, wherein the local home automation network is a radiofrequency network.

12. A portable installation driver package to carry out the method as claimed in claim 1, wherein said portable installation driver package comprises:
   first means suitable :or enabling the installation driver package to exchange data locally with the communicating packages and driver packages of the local home automation network;
   second means suitable for enabling the installation driver package to access the Internet network to exchange data with the central platform via wireless connections for all the mobile operators on the predefined list; and
   software routines stored in a read-only memory, suitable for carrying out said search, pairing and test steps.

13. The portable installation driver package as claimed in claim 12, wherein said portable installation driver package furthermore includes a screen and a keyboard.

\* \* \* \* \*